United States Patent [19]

Tanaka et al.

[11] Patent Number: 4,658,299
[45] Date of Patent: Apr. 14, 1987

[54] IMAGE PROCESSING SYSTEM

[75] Inventors: Kanou Tanaka; Motofumi Konishi, both of Yokohama; Yoshio Ando, Chigasaki; Toshio Iwaya, Shiki; Masahide Kotera, Yokohama; Norio Hashimoto, Tokyo; Yasutoshi Sugita, Urayasu; Yoshitaka Sano, Matsudo; Satoshi Ono, Yokohama, all of Japan

[73] Assignee: Canon Kabushiki Kaisha, Tokyo, Japan

[21] Appl. No.: 658,300

[22] Filed: Oct. 5, 1984

[30] Foreign Application Priority Data

Oct. 12, 1983 [JP] Japan ................................ 58-191336
Oct. 12, 1983 [JP] Japan ................................ 58-191337
Oct. 12, 1983 [JP] Japan ................................ 58-191340
Dec. 22, 1983 [JP] Japan ................................ 58-243449

[51] Int. Cl.$^4$ ............................................. H04N 1/10
[52] U.S. Cl. .................................... 358/256; 358/280; 358/293
[58] Field of Search ............... 358/256, 257, 280, 288, 358/286, 293, 294

[56] References Cited

U.S. PATENT DOCUMENTS 4,383,277  5/1983  Kubo .................................... 358/256

Primary Examiner—Edward L. Coles, Sr.
Attorney, Agent, or Firm—Fitzpatrick, Cella, Harper & Scinto

[57] ABSTRACT

An image processing system transmits image information in the form of electrical signals among plural stations for processing. A switching unit is provided to supply plural sets of signals to the plural stations in a parallel manner, thus achieving efficient signal transmission.

22 Claims, 17 Drawing Figures

|  | IMAGE INPUT | | |
|---|---|---|---|
|  | 2 (11) | 5 (15) | 1 (14b) |
| 3 (12) | 72 | 52 | 61 |
| 6 (16) | 73 | 53 | 62 |
| 7 (10) | 74 | 54 | 63 |
| 1 (14a) | 71 | 51 | — |

(IMAGE OUTPUT)

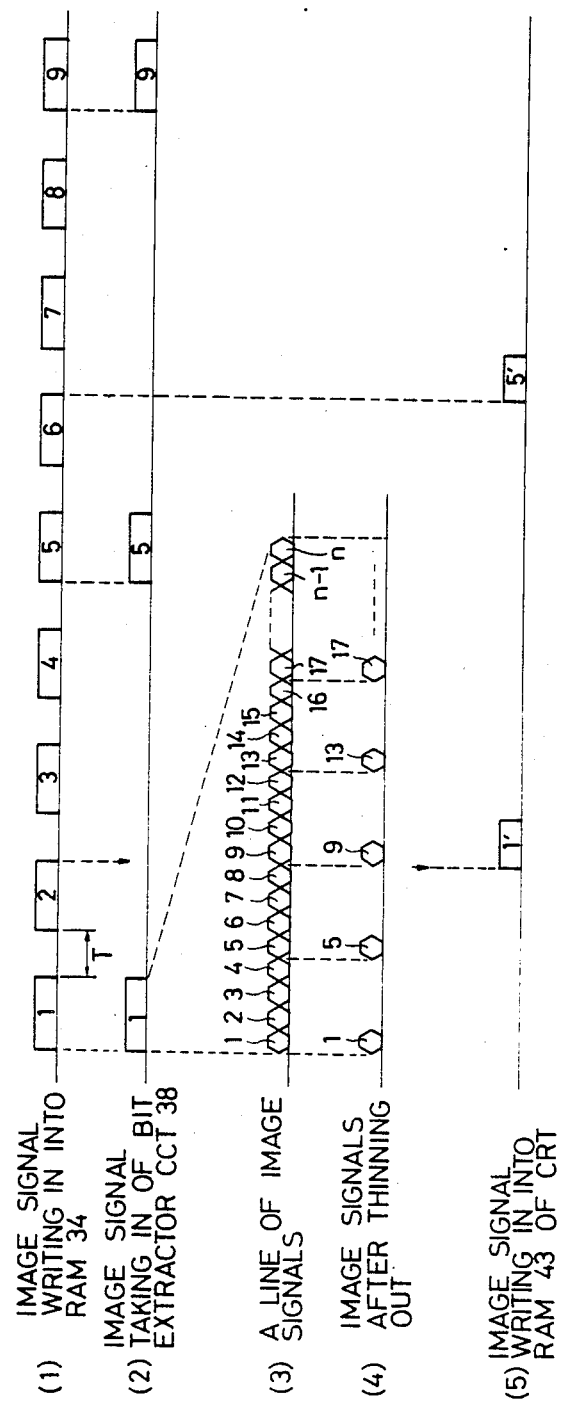

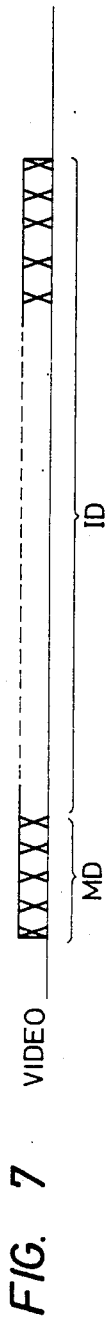

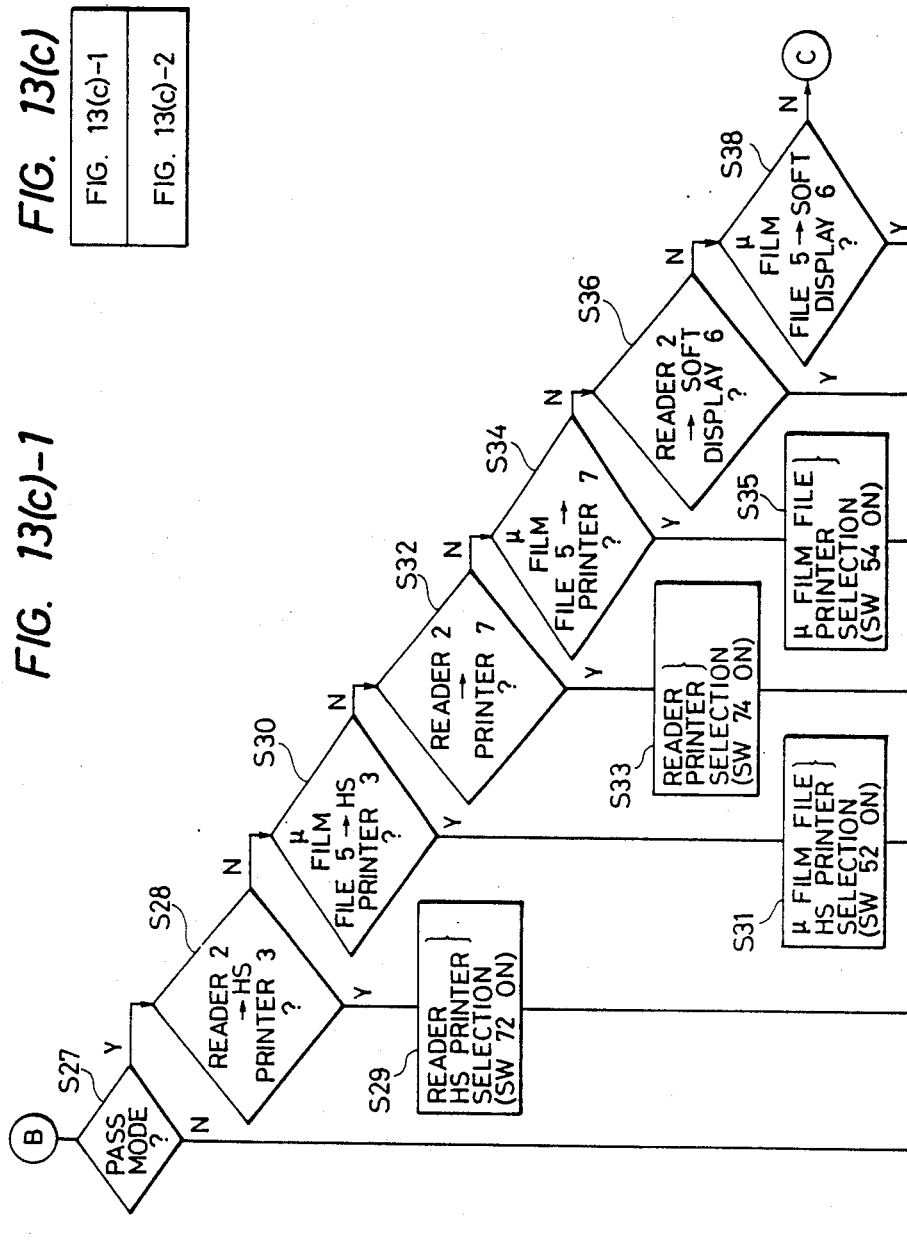

IMAGE PROCESSING SYSTEM

BACKGROUND OF THE INVENTION

1. Field of the Invention

The present invention relates to an image processing system for processing image information in the form of electrical signals.

2. Description of the Prior Art

There is already known image recording in response to image signals obtained by photoelectrically reading image information, or transmission of said signals to a distant location. One of the advantages of processing the image information in the form of electrical signals lies in the possibility of forming a so-called network composed of plural stations for image signals processing mutually connected through transmission channels, thus enabling arbitrary signal transmission among said stations Such a system is, however, associated with a drawback that, during signal transmission between certain stations, other stations are not available for the transmission of information. For example, a facile copying operation is difficult to achieve when an original reading unit and a printer unit belonging to the system are used as a copying apparatus.

Also, such system is provided with a control unit for controlling the system, and the image information is transmitted through said control unit at the image processing. However, the transmission of the image signals through the control unit is unnecessary and is sometimes disadvantageous in terms of speed and control of the processing in case a simple copying operation is desired.

Besides, such image processing system as described above may receive image information from various sources other than the aforementioned original reading unit, such as a magnetic disk, a communication unit or a microfilm file for photoelectrically reading microfilms. These image information sources have different transfer rates of the image information. For example, the original reading unit utilizing a CCD image sensor of ca. 5,000 bits for reading an A3 sized original image has an output transfer rate of 18 MHz, while a microfilm file utilizing a relatively small CCD image sensor of ca. 3,600 bits matching the image size has an output transfer rate of 8 MHz. In consideration of the cost and space, the image processing apparatus should preferably be capable of adapting to all such sources of different transfer rates, but the wiring becomes complicated and costly if separate signal lines are required for each image information source to be connected.

Besides, in case of reading, for example, a document with a scanner and storing the obtained electrical signals into a memory unit such as an optical disk file, by means of a conventional system in which the reading start signal is released from a keyboard of a control unit or a work station, the operator is required to manipulate the keyboard of the work station after the document is placed on the scanner. This inconvenience of manipulating two terminals is particularly marked in case the apparatus lacks an automatic original feeder or in case of handling bound originals.

SUMMARY OF THE INVENTION

In consideration of the foregoing, an object of the present invention is to provide an image processing system allowing an efficient and handy method of use.

Another object of the present invention is to provide an image processing system which is not limited to a single information transmission but is capable of plural transmissions, thus enabling effective utilization of the system.

Still another object of the present invention is to provide an image processing system capable of image signal transmission in a manner suitable for a simple copying operation or display in case such function if desired, thus achieving efficient image processing and shorter operation time of the system.

Still another object of the present invention is to provide an image processing system by connecting stations of different functions and simple structures.

The foregoing and still other objects of the present invention, and the advantages thereof will become fully apparent from the following discription.

BRIEF DESCRIPTION OF THE DRAWINGS

FIG. 6 is a timing chart showing the function of the bit extracting circuit;

FIG. 7 is a schematic view showing the structure of the image signals;

FIG. 8 is a chart showing size bit signals MD;

DETAILED DESCRIPTION OF THE PREFERRED EMBODIMENTS

Now the present invention will be clarified in detail by embodiments thereof shown in the attached drawings.

Figure 1:
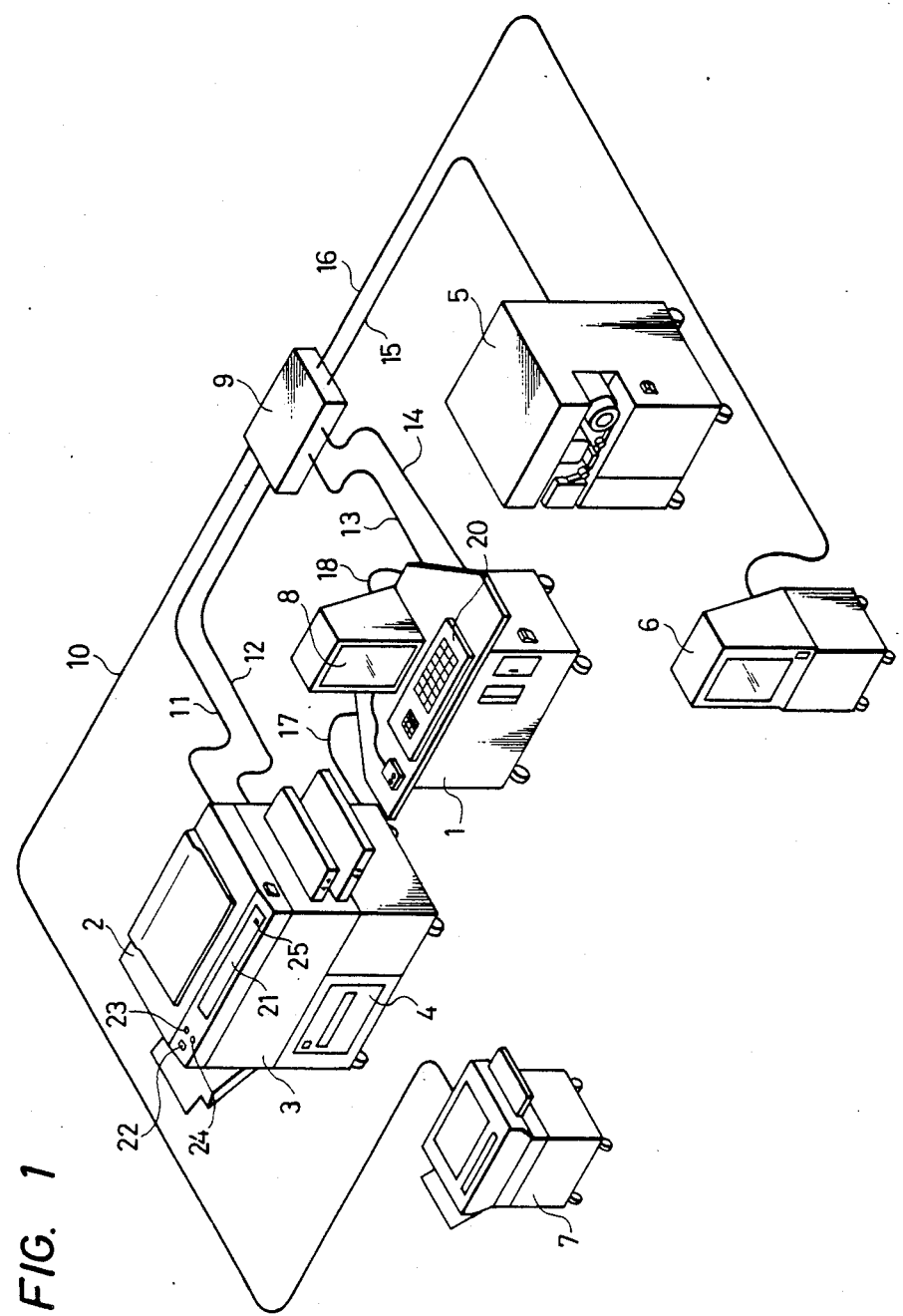
FIG. 1 is an external view of an image processing system embodying the present invention.

FIG. 1 is an external view of an image processing system embodying the present invention. A control unit 1, to be hereinafter called a work station, is composed of a microcomputer for system control, internal memories such as RAM, ROM etc., and external memories such as a floppy disk or a cartridge disk. Said work station 1 generate various commands for the system. Also, it applies electrical processes such as translation, erasure, size modification etc. to the input image signals in response to the instruction of the operator, generates sentences from the characters and symbols entered by the operator through a keyboard to be explained later, and performs synthesis of an image and a text or of different images. An original reader 2 constitutes an input unit of a digital copier and converts the information contained in an original document placed on a document platen into electrical signals through an image sensor, such as a CCD, of ca. 5,000 bits. A high-speed printer 3, composed, for example, of a laser beam printer and constituting an output unit of the digital copier, records an image on a recording material in response to the information in the form of electrical signals. An image file 4 is equipped with a recording medium such as an optical disk or an optomagetic disk for recording and reading a large amount of image information. Said image file 4 may be designed to store the image information in a compressed form. A microfilm file 5 is equipped with a microfilm retrieval unit and a microfilm reader unit for converting the image information on a retrieved microfilm into electrical signals by means of an image sensor such as a CCD of ca. 3,600 bits. A high-resolution soft display unit 6 provided with a photosensitive belt having a photoconductive layer on a transparent conductive substrate belt, and capable of displaying an image by irradiating said photoconductive layer with a laser beam modulated according to the input image signals to form an electrostatic latent image on said photoconductive layer according to the pattern of the original image and rendering said latent image visible through development with a conductive magnetic toner powder supported on a toner carrier. A printer unit 7 is composed, for example, of a laser beam printer similar to, but smaller and slower than, the printer unit 3, and is provided in case of necessity. A cathode ray tube unit 8 displays the image information photoelectrically read by the scanner unit of the digital copier and the microfilm file, and the control information of the system. A switching unit 9 switches the connections of the input/output stations according to the signals from the control unit. Cables 10 through 18 electrically connect the input/output stations. A keyboard 20, provided on the control unit 1, is used for generating commands for the system and performs the function as a work processor or an office computer in combination with the cathode ray tube unit 8. An operation panel 21 is used for controlling the function of the digital copier, and is provided with function keys for setting the copy number, copy magnification etc., a copy key 25 for instructing the start of a copying operation, a numeral indicator etc. There are also provided a mode selecting switch 22 to be explained later, and display units 23, 24 composed of light-emitting diodes (LED's) for indicating the mode selected by the mode selecting switch 22. The above-described system may further contain other word processors, office computers, facsimile units etc.

Figure 2:
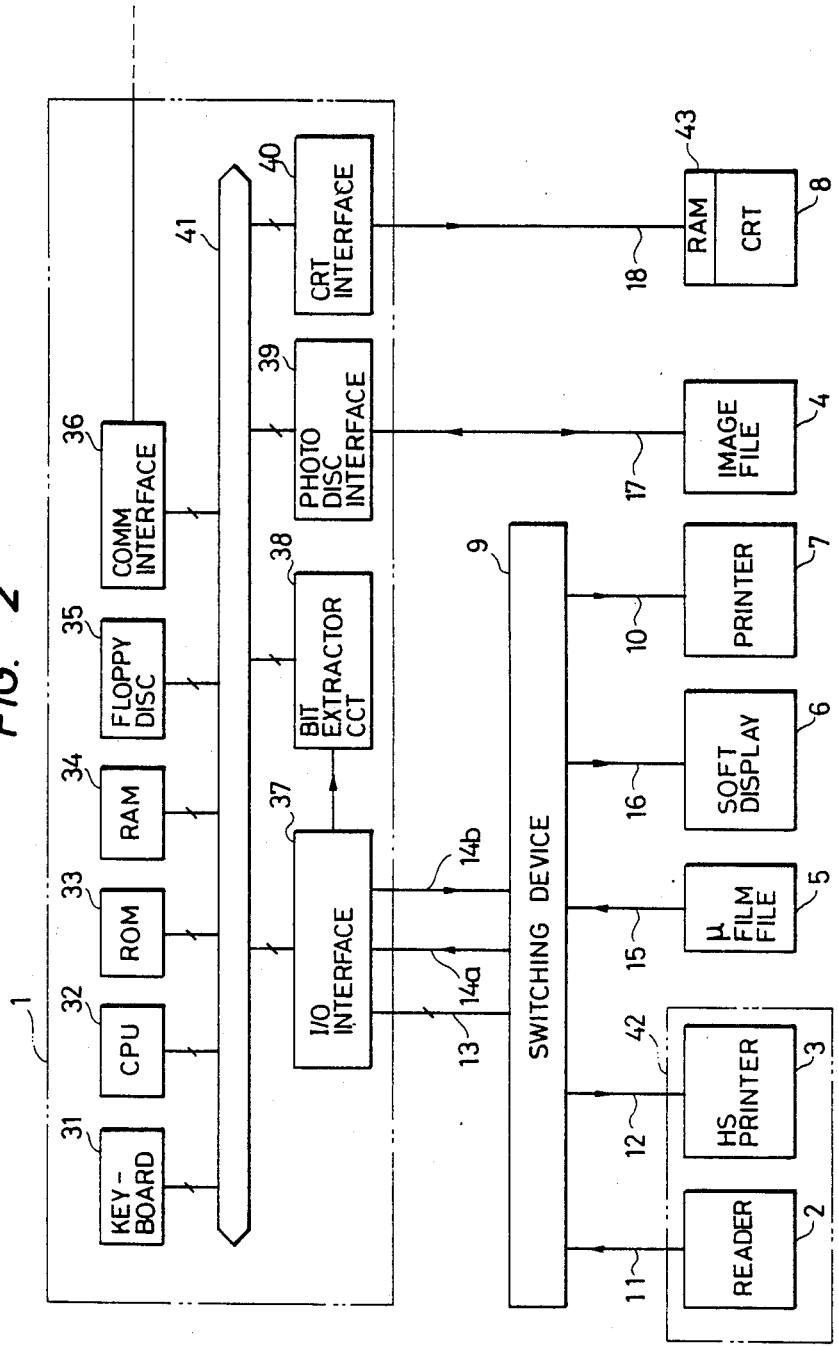
FIG. 2 is a block diagram showing the circuit structure of the image processing system.

FIG. 2 is a block diagram showing the circuit structure of the image processing system shown in FIG. 1, wherein blocks corresponding to those in FIG. 1 are represented by same numbers. In the control unit 1, there are provided a keyboard 31 corresponding to the keyboard 20 shown in FIG. 1 which is used for entering commands to the system; a central processing unit (CPU) 32 composed of a microcomputer, for example "68000" produced by Motorola; a read-only memory (ROM) 33 for storing a control program according to which the CPU 32 performs the control operation; a random access memory (RAM) 34 principally utilized as a working memory for the CPU 32 or a page memory for storing image signals transmitted between input/output units; an external memory 35 composed of a floppy disk for storing the control program of the system and the data base for image retrieval from the image file and microfilm file; a communication interface 36 for enabling information transmission with other similar systems or terminals through communication channels such as a local area network or a digital facsimile line; an input/output interface 37 for information transmission between the control unit 1 and the switching unit 9; a bit extracting circuit 38 for extracting the bits of the image signals at a certain rate; an optical disk interface 39 for information transmission with the image file 4; a CRT interface 40 for information transmission with the CRT unit 8; a 16-bit bus 41 for signal transmission among various blocks in the control unit 1, said bus being also connectable directly with a conventional word processor or office computer; and cables 10 through 18 electrically connecting the various input/output units for transmitting control signals, image signals, and clock pulses synchronized with the image signals, wherein the image signals flow as indicated by an arrow while the control signals flow bidirectionally. As will be apparent from the drawing, the original reader 2 and high-speed printer 3 of the digital copier 42, microfilm file 5, soft display unit 6 and small printer 7 are connected to the switching unit 9 respectively through the cables 11, 12, 15, 16 and 10 and are connected to the I/O interface 37 of the control unit 1 through the cables 13 and 14. Also the image file 4 and the CRT unit 8 are connected, respectively, to the interfaces 39, 40 of the control unit 1 through the cables 17, 18. The CRT unit 8 is provided with a display RAM 43 for storing the image information to be displayed. The I/O interface 37 is provided with a serial-to-parallel register for receiving the image signals and a parallel-to-serial register for image signal output, since the switching unit 9 transmits the image signals in the form of serial signals while the bus 41 of the control unit 1 carries the information in the form of parallel signals. The parallel image signals are subjected to DMA transmission of the bus 41.

The image signals released from the original reader 2 or the microfilm file 5 are supplied, in the unit of each line, to the I/O interface 37 of the control unit 1 through the switching unit 9. Said I/O interface 37 converts the image signals serially entered in synchronization with the aforementioned clock pulses into 16-bit parallel signals. The signals thus converted are supplied through the bus 41, and stored, in the unit of each page, in an image area of the RAM 34. The signals, thus stored, in the RAM 34 are released again through the bus 41 for transmission to the exterior through the communication interface 36, for storage in the optical disk in the image file through the optical disk interface 39, or for supply to the switching unit 9 through the I/O interface 37 for image formation selectively in the high-speed printer 3, soft display unit 6 or small printer 7.

On the other hand, the image signals read from the optical disk of the image 4 are once stored in the RAM 34, and then supplied selectively to the high-speed printer 3, soft display unit 6 or small printer 7 through the I/O interface 37 and the switching unit 9.

The image signals from the original reader 2 or the microfilm file 5 may be supplied from the switching unit 9 selectively to the high-speed printer 3, soft display unit 6 or small printer 7 without passing the control unit 1. Since the image file 4 or the CRT unit 8 is not required in a simple copying operation, the image signals for example from the original reader 2 are directly supplied to the high-speed printer 3 without passing through the control unit 1 to achieve a read-time copying operation. Such operation mode is called pass mode.

The control relating to the above-mentioned transmission of image signals is performed by the CPU 32 according to the commands entered by the operator through the keyboard 31.

Figure 3:
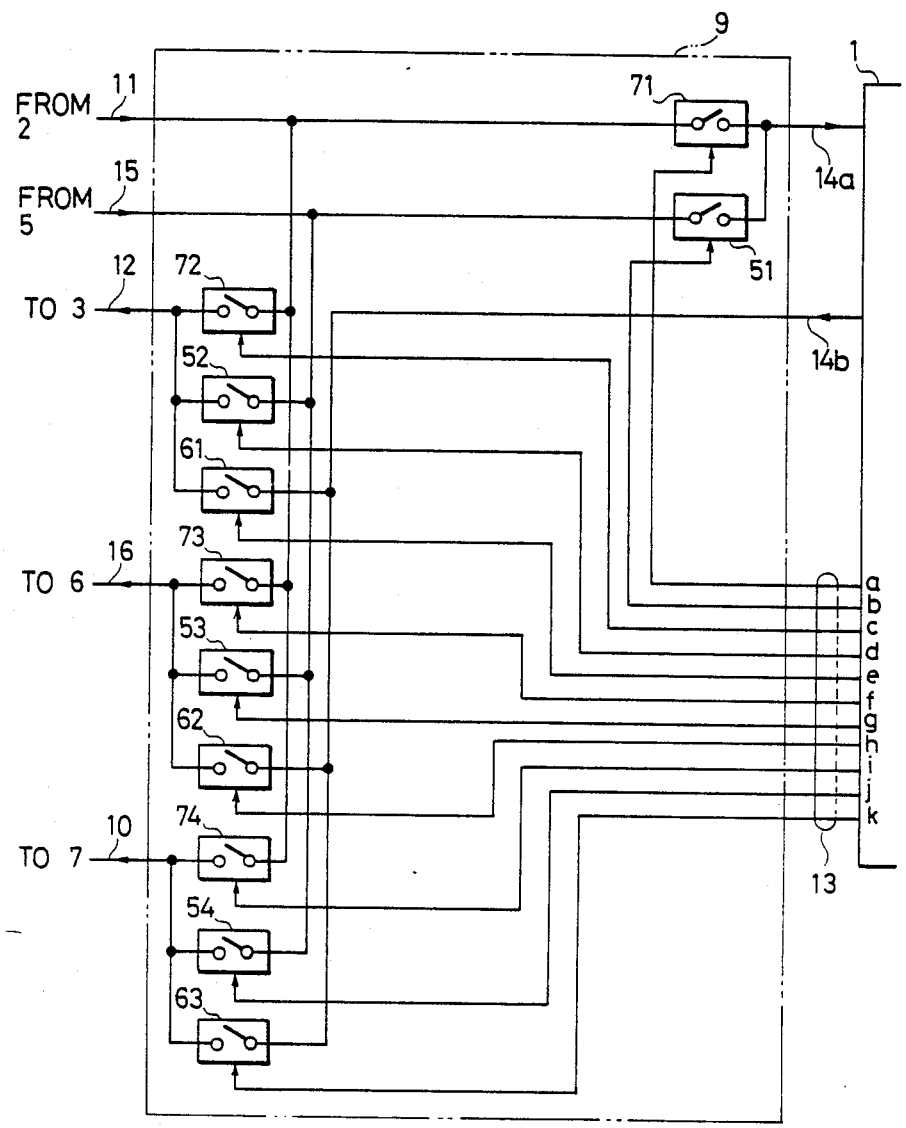
FIG. 3 is a circuit diagram of a switching unit.
Figures 4, 5:
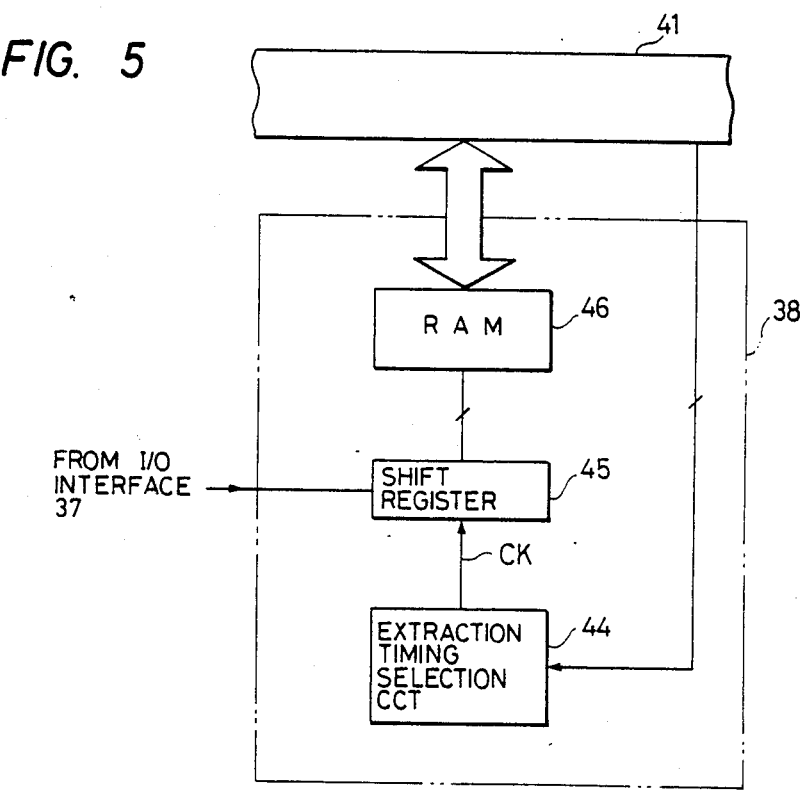
FIG. 4 is a chart showing the combinations of the switching operations.
FIG. 5 is a block diagram showing the circuit structure of a bit extracting circuit.

FIG. 3 shows the detailed circuit structure of the switching unit 9, wherein same cables as those in FIG. 2 are represented by same numbers There are provided switches 51 through 54, 61 through 63 and 71 through 74 controlled by switching signals a through k transmitted from the control unit 1 through the cable 13. The switches 51 through 54 select the destination of the image signals released from the microfilm file 5 through the cable 15. The switches 61 through 63 select the destination of the image signals released from the control unit 1 through the cable 14b. The switches 71 through 74 select the destination of the image signals released from the original reader 2 through the cable 11. FIG. 4 shows the connection between the original reader 2, microfilm file 5 and control unit 1 for supplying the image signals and the high-speed printer 3, soft display unit 6, small printer 7 and control unit 1 for receiving the image signals, in relation to the function status of the switches 51 through 54, 61 through 63, 71 through 74, wherein the parenthesized figures indicate the numbers of the cables transmitting the image signals. Also the indicated switch numbers indicate that the corresponding switches are closed. The switching unit 9 may also be composed of a logic circuit utilizing AND and OR gates.

In the following, there will be explained the function of the switching unit 9. As an example, in case switches 72, 53 and 63 are closed, there is achieved the function of a digital copier, in which the image signals from the original reader 2 are transmitted to the high-speed printer 3 through the switch 72. On the other hand, the image signals from the microfilm file 5 are transmitted to the soft display unit 6 through the switch 53, and the image signals from the control unit 1 are transmitted to the small printer 7 through the switch 63.

In this manner selective control of the switches of the switching unit 9 allows arbitrary connection of the input/output units and enables the present system to effectively perform the functions of display, copy and data file. Also there is enabled simultaneous plural transmissions of image information to avoid the inconvenience of unavailability of other input/output devices during the transmission of image information between certain units. Furthermore a high-speed process is rendered possible in case of a simple copying or display operation, since the image signals from the original reader 2 or the microfilm file 5 can be directly transmitted to the high-speed printer 3, soft display unit 6 or small printer 7 in the aforementioned pass mode, without the use of the control unit 1.

In the following, there will be explained the function in case the CRT unit 8 displays the image signals released from the original reader 2 or the microfilm file 5. The present system employs a high-resolution cathode ray tube, capable of displaying information of ca. $6 \times 10^4$ bits. On the other hand, the original reader 2 can read originals up to the A3 size, and an original reading of the A4 size ($210 \times 297$ mm) with a resolving power of 16 pel/mm provides information of $16 \times 210 \times 297 =$ ca. $10^6$ bits. The microfilm file 5 also provides image information of similar magnitude. Consequently, the amount of information has to be compressed to about 1/16 in case the image information from the original reader 2 or the microfilm file 5 is to be stored in the RAM 34 and displayed on the CRT unit 8. The bit extracting circuit 38 shown in FIG. 2 performs said compression as well as the image signal storage into the RAM 34.

FIG. 5 shows the structure of said bit extracting circuit 38, wherein shown are a bus 41 in the control unit 1; an extraction timing selection circuit 44 provided with a clock pulse generator which is composed of a crystal oscillator, a frequency divider etc. and generates clock pulses CK according to a compression command from the CPU 32; a shift register 45 for sampling the image signals supplied from the I/O interface 37 in response to the clock pulses CK from said extraction timing selection circuit 44 and sequentially storing thus sampled image signals; and a RAM 46 for receiving signals from the shift register 45 when it is filled with the signals and supplying said compressed image signals to the bus 41 at determined timings. The I/O interface 37 supplied the image signals received from the switching unit 9 to said bit extracting circuit 38, simultaneously with the supply to the bus 41 for storage in the RAM 34. In this manner the image signal compression for CRT display is performed simultaneously with the storage into the RAM 34 of the image signals supplied from the original reader 2 or the microfilm file 5. Consequently the entered image signals can be immediately displayed on the CRT.

FIG. 6 shows the function of the bit extracting circuit 38. The switching unit 9 repeatedly releases the image signals in the unit of each line through the I/O interface 37 to the bus 41, for storage in the RAM 34. In FIG. 6, (1) indicates the timing of image signal storage into the RAM 34 through the I/O interface 37 and the bus 41, wherein numerals 1 through 9 indicate the numbers of image lines. It is to be noted that a blank time T exists between the release of image signals of a line and that of a succeeding line. The I/O interface 37 supplies the image signals entered from the switching unit 9 also to the bit extracting circuit 38, which performs the extraction of the image signals in the aforementioned manner in synchronization with the clock pulses CK from the extraction timing selection circuit 44. FIG. 6 shows a case of 1/16 compression of the image signals, in which the input image signals are extracted at a rate of one line out of four lines by selecting (4N+1)-th lines where N is 0 or a positive integer, and are further extracted at a rate one dot per four dots from thus selected (4N+1)-th lines.

FIG. 6 (2) shows the extraction of the image signals at a rate of one line per four lines, and FIG. 6 (3) shows the image signals of one line thus extracted. Also FIG. 6 (4) shows the extraction of the image signals at a rate of one bit from every four bits. In FIGS. 6 (3) and (4) the numerals 1-n shown in the drawing indicate the numbers of bits.

The 1/16 compression of the image signals entered from the switching device 9 to the input/output interface 37 is achieved in this manner by extracting said image signals at a rate of one line per every four lines and by further extracting thus extracted image signals at a rate of one bit per every four bits.

The bit extracting circuit 38 temporarily stores the image signals after the compression into the RAM 46, and said signals are stored in the RAM 43 by RAM transmission through the bus 41 during the blank period T in the image signal transmission from the I/O interface 37 to the RAM 43. An efficient transmission through the bus 41 during the blank period T is rendered possible since the image signals 1', 5' after the compression is less in quantity than the image signals stored in the RAM 34. Consequently the storage of the compressed image signals into the RAM 43 can be completed during the period of storage of the original uncompressed image signals into the RAM 34. The image signals after compression corresponding to a line need not be transmitted to the RAM 43 of the CRT unit within a blank time T but can be divided over several blank times. Also, the compressed image signals of plural lines may be transmitted within a blank time T.

The above-described function of the bit extracting circuit 38 is controlled by the CPU 32. Also, the compression rate of the image signals is determined by the image size of the image signals released from the I/O interface 37. More specifically, in case of displaying the entire image over the display frame of the CRT 8, an effective display over the display fram of CRT without defects is realized by determining the compression rate on the input image signals in response to the amount of the image signals corresponding to the displayed image. For this purpose data indicating the image size are released at the release of the image signals from the original reader 2 or the microfilm file 5, and the CPU 32 calculates an optimum compression rate from said date to control the extraction timing selection circuit 44.

FIG. 7 shows the format of the image signals released from the original reader 2 or the microfilm file 5. In front of the image signals ID of a frame, there are provided size bit signals MD of 4 bits indicating the image size. The interval between said size bit signals MD and the image signals ID is determined in response to the operating speed of the CPU 32. Said size bit signals MD are set in response to the recognition of the frame size of the original or microfilm in the original reader 2 or the microfilm file 5, either through automatic original detecting function or manual size selection. The CPU 32 reads said size bit signals MD at the entry of the image signals, and controls the timing of the clock pulse generation in the extraction timing selection circuit 44, in order to achieve a compression corresponding to said size bits signals MD. FIG. 8 shows the image sizes indicated by the size bit signals MD employed in the present system and the corresponding compression rates R1 through R8. Said compression rates are determined according to the resolving power of the original reader 2, microfilm file 5 and CRT 8, and are stored in advance in the ROM 33. The command for executing the above-explained compression operation for the image signals is entered by the operator through the work station 1.

The input image signals can be monitored immediately since the signal compression for the CRT display is conducted simultaneously with the storage, into the RAM without compression, of the image signals entered from the switching unit 9. Also the aforementioned bit extracting circuit 38 can be utilized for the compression of the image signals read from the image file 4.

Furthermore, the compression rate may be determined according to the source of the image signals, instead of the aforementioned determination in response to the size of the image.

In the case of displaying on the CRT 8, the image signals obtained from the original reader 2 or the microfilm file 5, the aforementioned signal compression is applied to the image signals of high resolution to accomodate the entire image on the CRT. On the other hand, the soft display unit 6 employed in the present system has a higher resolving power than that of a CRT. More specifically, said soft display unit 6 has an A3-sized display frame, with a resolving power of 16 pel/mm. Also, as explained before, the original reader 2 and the microfilm file 5 can read an image with a resolving power of 16 pel/mm. Consequently, the image signals so obtained can be monitored with the same resolving power as in the image reading by sending the image signals from the original reader 2 or the microfilm file 5 to the soft display unit 6 instead of the CRT 8.

The image size of the image signals from the original reader 2 or the microfilm file 5 may be smaller than the A3 size, and, in such case, there will be formed a blank area in the display frame of the soft display unit 6. For achieving effective utilization of the display image area of the soft display unit 6, an enlargement is applied to the image information of which is smaller than the A3 size.

Figure 9:
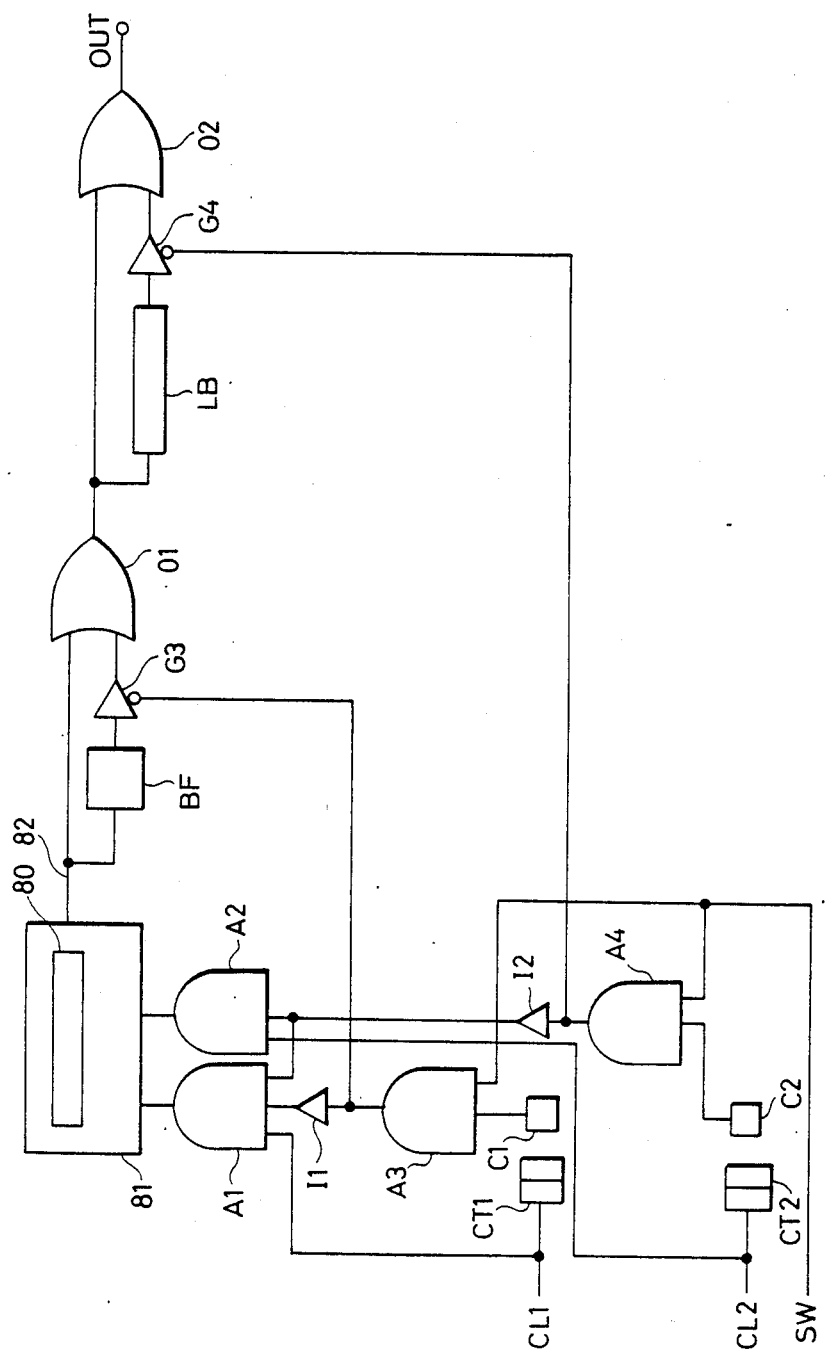
FIG. 9 is a block diagram showing an enlargement processing circuit.

FIG. 9, shows a circuit for enlargement of the image signals, which is provided in the original reader 2 and the microfilm file 5.

In FIG. 9, there are shown a linear sensor 80 composed of a CCD for reading an image; a driving circuit 81 for driving said linear sensor 80; a signal line 82 for releasing the signals read by said linear sensor 80 in synchronization with clock signals CL1; and line count clock signals CL2 for transferring the charges accumulated in the photodiodes of the linear sensor into a shift register of the driving circuit 81.

There are further shown 2-bit counters CT1, CT2 respectively for counting the clock signals CL1 and CL2; detectors C1, C2 for respectively detecting the carry-over signals of said counters CT1, CT2; a switching signal SW for activating the enlargement circuit in response to the image size of the image signals; AND gates A1 through A4; inverters I1, I2; OR gates 01, 02; gates G3, G4; a 1-bit buffer BF; and a line buffer LB.

The function of the above-described circuit is as follows. When the switching signal SW is at the low level, indicating that the enlargement process is unnecessary, the AND gates A3, A4 release low level signals, whereby the AND gates A1, A2 receive high-level signals respectively through the inverters I1, I2 and through the inverter I2. Consequently, the clock signals CL1, CL2 are supplied without change to the driving circuit 81 respectively through said AND gates A1, A2. Also the gates G3, G4 are inactive, so that the serial image signals are released to an output terminal OUT in the unit of each line, in synchronization with said clock signals CL1, CL2.

On the other hand, when the switching signal SW is at the high level, indicating that the enlargement process is required, the AND gates A3, A4 release the high-level signals respectively when the detectors C1, C2 detect the carry-over signals. In response the inverters I1, I2 release low-level signals, whereby the AND gates A1, A2 prohibit the transmission of the clock signals CL1, CL2 to the driving circuit 81.

Thus, when the detector C1 releases the carry-over detection signal, the clock signals CL1 are not supplied to the driving circuit 81, which does not therefore provide the image signals to the line 82. On the other hand, the gate G3 is opened to release the immediately preceding image signal stored in the 1-bit buffer BF through the OR gate 01. In this manner an image signal is released twice at a rate of one out of every 4 clock pulses, and the image signals are expanded 1.25 times in the line direction.

Also, when the detector C2 releases the carryover detection signal, neither the clock signals CL1 nor the clock signals CL2 are supplied to the driving circuit 81, which does not therefore release the image signals. On the other hand, the gate G4 is opened to release the image signals of an immediately preceeding line stored in the line buffer LB through the OR gate 02. In this manner, the image signals of a line are repeated at a rate of one out of every four lines, whereby the image is expanded 1.25 times in the subsidiary scanning direction perpendicular to the line direction.

The aforementioned switching signal SW is released from the original reader 2, microfilm file 5 or control unit 1 to execute the enlarging process, for example, in response to the result of automatic size detection of the original placed on the original reader 2 indicating that the original size is smaller than the display area of the soft display unit 6, or in response to an enlarging command entered by the operator.

In this manner, the enlarged display on the soft display unit 6 through the enlargement process allows effective utilization of the display thereof and facilitates the observation of the image by the operator. In the present embodiment, there is only considered an enlargement of 1.25 times in both directions, but it is also possible to provide plural enlargement ratios to achieve an optimum enlarged display according to the original size. Also, the enlargement in the subsidiary scanning direction can be also achieved by physically changing the subsidiary scanning speed of the linear sensor.

Also, the original size to be read by the original reader 2 may be larger than the display area of the soft display unit 6. In such case a reducing process may be applied similarly to the image, thus displaying the entire image, without loss, on the display area of the soft display unit 6.

In the case of sending the image signals obtained in the original reader 2 to the control unit 1 and storing said signals in the image file 4 equipped with the optical disk, the operation command for the scanner is entered through the keyboard 31 of the control unit 1. However, in case the original reader lacks an automatic original feeder when the images of plural pages are to be read or in case of handling bound originals, the operator is required to manipulate the original reader 2 and the control unit 1, alternately.

On the other hand, in the case of storing the image signals obtained in the microfilm file 5 in the image file 4, it is not necessary to operate two units as explained above, since the microfilm file 5 of the present system is provided with a microfilm frame retrieving function which can be controlled through keyboard of the control unit 1.

In order to avoid the above-mentioned drawback, the command for storing the image signals obtained in the original reader 2 in the image file 4 can be entered from the original reader in the present system. As shown in FIG. 1, the original reader 2 is provided with an operation panel 21 for entering commands for performing the function of a digital copier, and said operation panel 21 is equipped with a copy key 25. The scanner operation in the original reader 2 for storing the image signals in the image file 4 can be started either by the control unit 1 or by the copy key 25, and the selection is made by the mode selection switch shown in FIG. 1.

Figure 10:
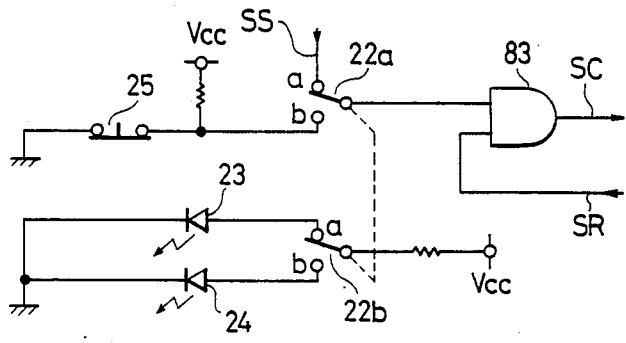
FIGS. 10 to 12 are circuit diagrams showing the structure of a switching circuit for the drive instruction mode of the original reader.

FIG. 10 shows a circuit for said selection, wherein linked switches 22a, 22b are shifted simultaneously by the switch 22. When the switch 22a is positioned at a contact (i), a scanner start signal SS from the control unit 1 is supplied from said contact (i) to an AND gate 83. If the original reader 2 is operable in this state, a scanner ready signal SR is supplied to said AND gate 83, whereby a scanner start command SC is supplied from the AND gate 83 to an unrepresented control unit of the original reader 2. On the other hand, if the switch 22a is positioned at a contact (ii), the scanner start signal SS from the control unit 1 is not supplied to the AND gate 83. If the copy key 25 of the original reader 2 is depressed in this state, a high-level signal is supplied to the AND gate 83 in synchronization with said depression. The scanner start command SC is released, if the aforementioned scanner ready signal SR is present in this state. Consequently, when the switch 22a is positioned at the contact (ii), the scanner start command SC can be generated by the actuation of the copy key 25 in the same manner as the scanner start signal SS from the control unit 1, thus initiating the original scanning.

The switch 22b linked with the switch 22a is shifted likewise to light a light-emitting diode 23 or 24 to indicate the adopted mode to the operator. Thus, the operator can suitably select the mode of entry of command for starting the original reader from the lighting state of the LED's 23, 24.

Figure 11:
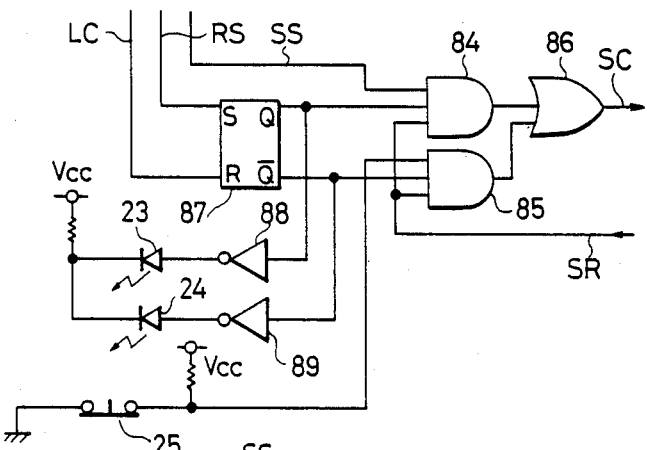

In FIG. 11, the circuit shown in FIG. 10 is composed of logic circuits. In the present circuit, mode selection is made in the control unit 1. In case the original reader 2 is to be started by the control unit 1, a corresponding command is given by the keyboard 31 thereof, whereby a remote signal RS is supplied to a set terminal of a flip-flop 87 to set said flip-flop. Upon said setting, a high-level signal is supplied from a terminal Q to an AND gate 84. If the aforementioned scanner ready signal SR is supplied to the AND gate 84 upon entry of the scanner start signal SS from the control unit 1, the scanner start command SC is supplied through an OR gate 86 to the control unit of the original reader 2, thus initiating the original scanning.

On the other hand, in case the original reader 2 is to be started by the copy key 25 of the original reader 2, a corresponding command from the keyboard 31 shifts the remote signal RS to the low level state, while a local signal LS is shifted to the high level state. Thus, the flip-flop 87 is reset whereby the output Q to the AND gate 84 is shifted to the low level while the output $\bar{Q}$ to the AND gate 85 is shifted to the high level. Upon actuation of the copy key 25 in this state, a high-level signal is suppled to the AND gate 85, and, in the presence of the scanner ready signal SR, the scanner start command SC is released from the AND gate 85 through the OR gate 86. In this state, the scanner start signal SS from the control unit 1 is not transmitted to the OR gate 86 since the AND gate 84 is closed.

Also, an LED 23 or 24 is lighted according to the mode in the same manner as in the circuit shown in FIG. 10, thus indicating the adopted mode to the operator.

Figure 12:
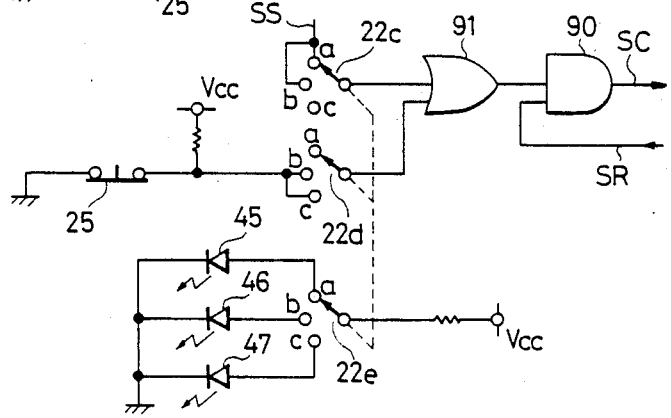

FIG. 12 shows still another embodiment in which the scanning operation of the original reader 2 can be initiated in three ways, i.e., either from the original reader 2, or from the control unit 1, or from both. In this embodiment, the mode selection switch 22 has three linked switches 22c, 22d, 22e. In case the switches 22c, 22d are positioned at contacts (ii), both the scanner start signal SS from the control unit and the signal generated from the copy key 25 can be transmitted to an AND gate 90 through an OR gate 91, so that, in this mode, the original reader can be started either from the control unit 1 or the original reader 2.

On the other hand, the original reader can be started from the control unit 1 alone in case the switches 22c, 22d are positioned at contacts (i), while it can be started from the original reader 2 alone in case said switches are positioned at contacts (iii).

In this manner, the original reader 2 can be started either from the control unit 1 or from the original reader 2, so that the original reader 2 can be controlled from the same position as the original setting position.

Figure 13A:
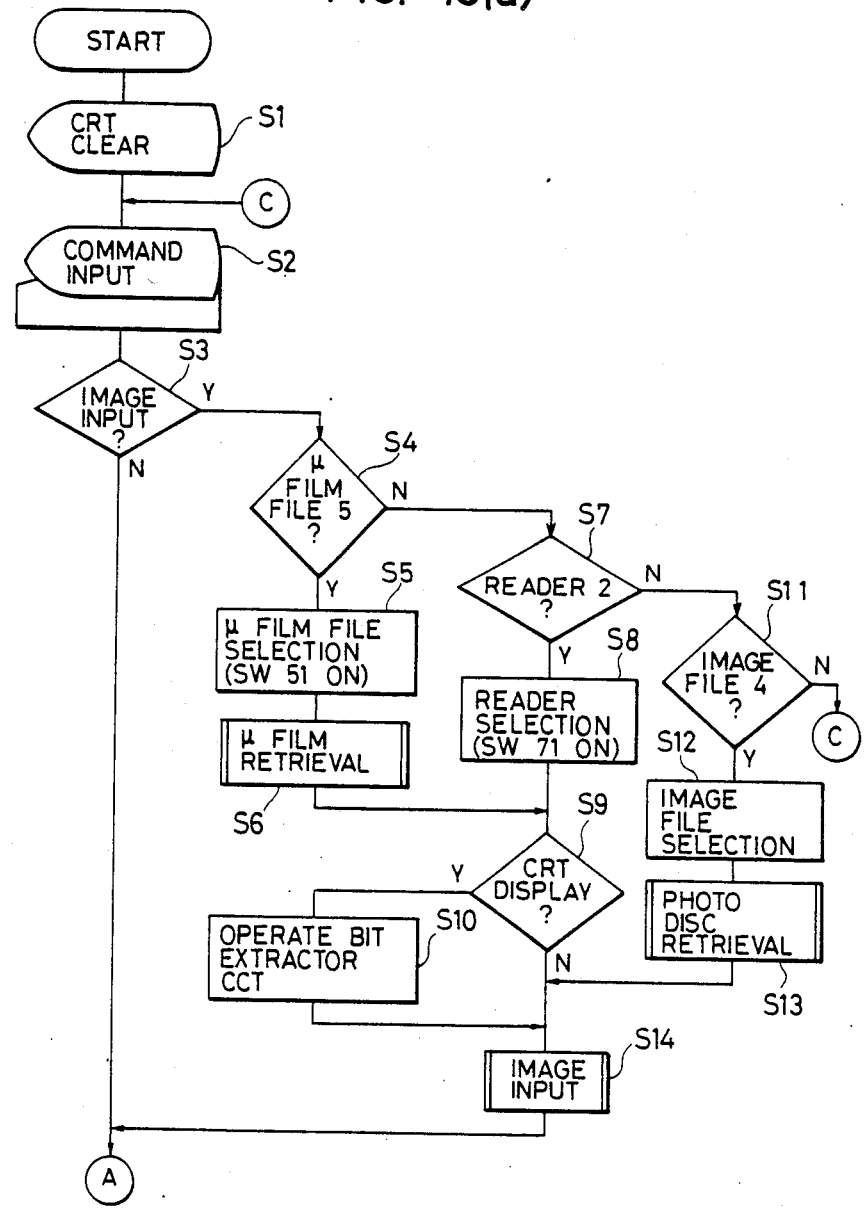
FIGS. 13($a$) to ($c$) (1-2) are flow charts showing the control program of the control unit.
Figure 13B:
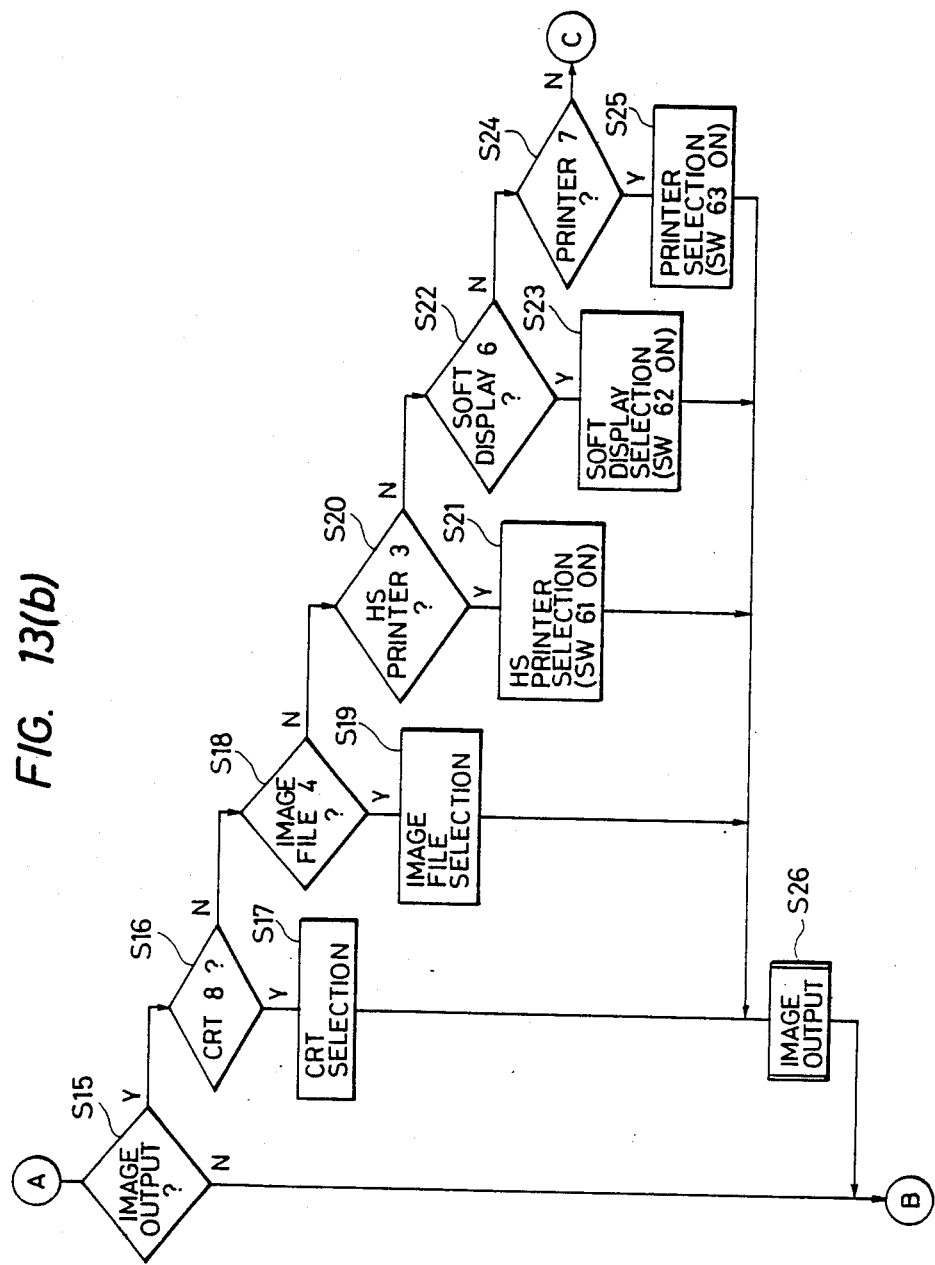
Figures 2, 13C:
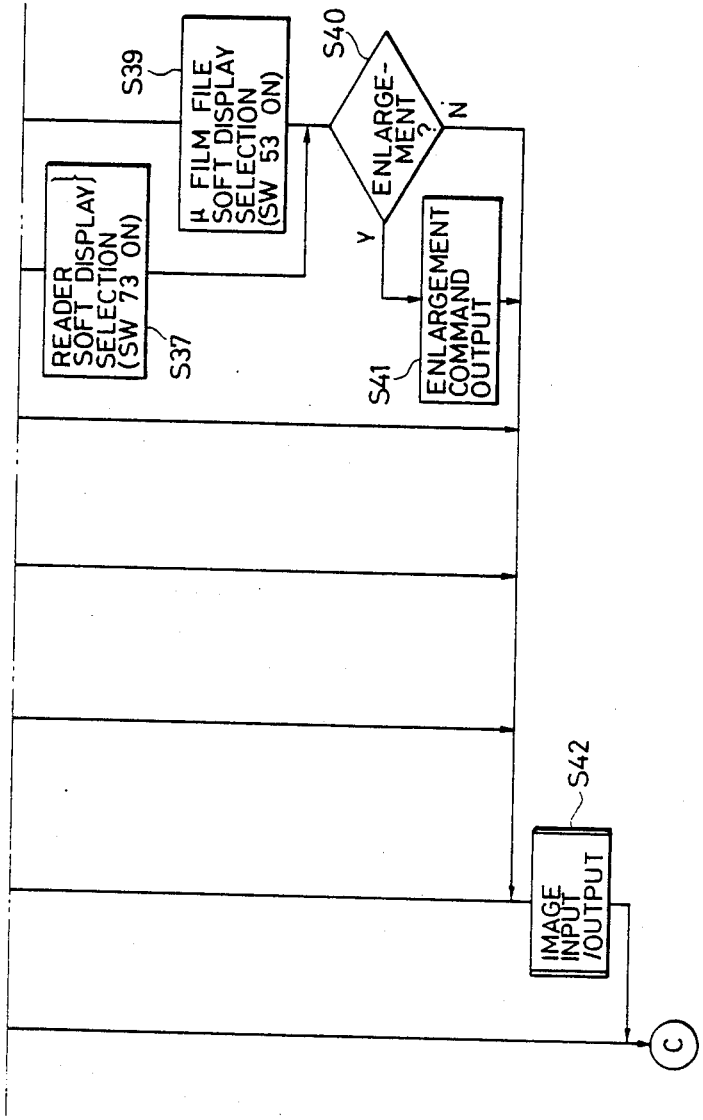

FIGS. 13 (a) through (c) are flow charts showing the control procedure of the system described above. The program corresponding to said flow charts is stored in the ROM 33 of the control unit 1 and is read therefrom by the CPU 32 for performing the control operation.

Upon start of power supply to the control unit 1 of the present system, a step S1 clears the display face of the CRT unit 8, and a step S2 displays, on the CRT 8, a message awaiting the entry of a command, thus preparing for the manipulation of the keyboard 31 by the operator. Examples of the commands to be entered by the operator are an image input command for storing the image signals into the RAM 34 of the control unit 1, an image output command for reading the image signals from said RAM 34, and a pass mode command for image signal transmission bypassing the control unit 1.

A step S3 discriminates whether the image input command has been entered, and, if not, the program proceeds to a step S15 for discriminating whether the image output command has been entered.

In case the image input command has been entered, steps S4, S7 and S11 are executed to identify whether the image input is to be done from the microfilm file 5, original reader 2 or image file 4. If the microfilm file 5 is selected, the program proceeds from the step S4 to a step S5 to supply a drive command to the microfilm file 5, and to turn on the switch 51 of the switching unit 9, thus forming a path for transmitting the output image signals from the microfilm file 5 to the I/O interface 37. Then, a step S6 searches a desired frame on the microfilm according to the retrieval data entered from the keyboard 31 while referring to the index stored in the floppy disk 35, and displays a message in case the desired frame is not found. In case the desired frame is found, a step S9 discriminates whether there has been entered a command for displaying the image read from the microfilm onto the CRT 8, and, if not, the program proceeds to a step S14. On the other hand, if said command has been entered, the program proceeds to a step S10 to supply a start command to the bit extraction circuit 38 for compressing the image signals for display on the CRT, and the program then proceeds to the step S14.

In case the original reader 2 is selected for image input, the program proceeds from the step S7 to a step S8 to supply a drive command to the original reader and to turn on the switch 71 of the switching unit 9, thus forming a path for transmitting the output image signals from the original reader 2 to the I/O interface 37. Then a step S9 discriminates whether there has been entered a command for CRT display, and the program proceeds to the step S14 in the absence of said command, or proceeds through the step S10 to the step S14 in the aforementioned manner in the presence of said command.

In case the image file 4 is selected for image input, the program proceeds from the step S11 to a step S12 to supply a drive command to the image file 4. Then, a step S13 is executed to search the image information on the optical disk, according to the retrieval data entered by the operator and referring to the index stored in the floppy disk 35, and the program further proceeds to the step S14 to supply the image input command to the selected image input unit to initiate the image input operation and to store the obtained image signals of a page into the RAM 34.

After the completion of said image input operation, or in case the image input command has not been entered, a step S15 discriminates whether the image output command has been entered.

In the presence of said command, steps S16, S18, S20, 22 and S24 are executed to identify the unit selected for image output. In case the CRT 8 is selected for image output, the program proceeds from the step S16 to a step S17 to supply a drive command to the CRT 8 and the program further proceeds to a step S26. In case the image file 4 is selected, a drive command is supplied to the image file 4 to secure a storage area therein for the image signals, and the program proceeds to the step S26. In case the high speed printer 3 is selected, the program proceeds from the step S20 to a step S21 to send a drive command to the high speed printer 3 thus initiating the preparatory operations such as laser activation, mirror rotation, sheet feeding etc. and to turn on the switch 61 of the switching unit 9 thus forming a signal path to the high speed printer 3, and the program then proceeds to the step S26. In case the soft display unit 6 is selected, the program proceeds from the step S22 to a step S23 to activate said unit 6 for preparing for the image display and to turn on the switch 62 of the switching unit for forming a signal path, and the program proceeds to the step S26. On the other hand, in case the small printer 7 is selected, a drive command is supplied to said small printer and the switch 63 of the switching unit is turned on to form a signal path to said printer 7, and the program then proceeds to the step S26.

The step S26 releases the image signals stored in the RAM 34 to the output unit selected and prepared in the above-described manner to cause the image recording or image display. In case the image from the microfilm file 5 or original reader 2 is to be displayed on the CRT 8, the display operation is conducted according to the display data already stored in the RAM 43 of the CRT 8.

It is also possible to simultaneously select plural different output units and to send the same image signals to said output units simultaneously or in succession to execute displays and/or recordings of a same image at plural locations.

A step S27 discriminates whether there has been selected the pass mode for image signal transmission without passing through the control unit 1. If said pass mode has been selected, steps S28, S30, S32, S34, S36 and S38 are executed to identify the combination of input/output units to be employed in said pass mode. In case a combination of the original reader 2 and the high speed printer 3 is selected, the program proceeds from the step S28 to a step S29 to send drive commands to both units and to turn on the switch 72 of the switching unit 9, thus forming a signal path from the original reader 2 to the high speed printer 3. In case a combination of the microfilm file 5 and the high speed printer 3 is selected, the program proceeds from the step S30 to a step S31 to send drive commands to both units and to turn on the switch 52 of the switching unit 9, thus forming a signal path from the microfilm file 5 to the high speed printer 3. In case a combination of the original reader 2 and the small printer 7 is selected, the program proceeds from the step S32 to a step S33 to send drive commands to both units and to turn on the switch 74 of the switching unit 9, thus forming a signal path from the original reader 2 to the small printer 7. In case a combination of the microfilm file 5 and the small printer 7 is selected, the program proceeds from the step S34 to a step S35 to send drive commands to both units and to turn on the switch 54 of the switching unit 9 for forming a signal path between said units. In case a combination of the original reader 2 and the soft display unit 6 is selected, the program proceeds from the step S36 to a step S37 to send drive commands to both units and to turn on the switch 73 of the switching unit 9 for forming a signal path from the original reader 2 to the soft display unit 6, and a step S40 is executed to discriminate if an enlarged display is required. In case such enlarged display is required, the program proceeds to a step S41 to send a switching signal SW to the enlargement process circuit shown in FIG. 9. In case a combination of the microfilm file 5 and the soft display unit 6 is selected, the program proceeds from the step S38 to a step S39 to send drive commands to both units and to turn on the switch 53 of the switching unit 9, thus forming a signal path between said units. Subsequently, the program proceeds to the step S40 to identify the requirement for the enlarged display as explained before, and, if required, the step S41 activates the enlargement process circuit.

Upon preparation of the units selected in the pass mode in the above-described manner, a step S42 causes the selected input unit to initiate the image input and the selected output unit to initiate the image output.

Also as explained before, the present system is capable of simultaneous plural transmissions of different image signals, for example the transmission of image signals in the pass mode from the original reader 2 to the smaller printer 7 under the control of the control unit 1 during the signal reception from the microfilm file 5 to the control unit 1.

As explained in the foregoing, the operation control of the present system is conducted by the CPU 32 according to the commands entered by the operator through the keyboard 31 of the control unit 1. The present system allows connection of various image input/output devices, thus enabling efficient utilization thereof and achieving improved work efficiency and speedier image processing. Naturally, the species and number of the input/output devices constituting the system may be suitably selected according to the mode of utilization.

As explained in the foregoing, the image signals released from the original reader 2 and the microfilm file 5 are both supplied to the switching unit 9, and then are transmitted to the I/O interface 37 of the control unit 1 through the common cable 149. If the transfer rate of the image signals from the origianl reader 2 is different from that from the microfilm file 5, the I/O interface 37 is required to function accordingly.

Figure 14:
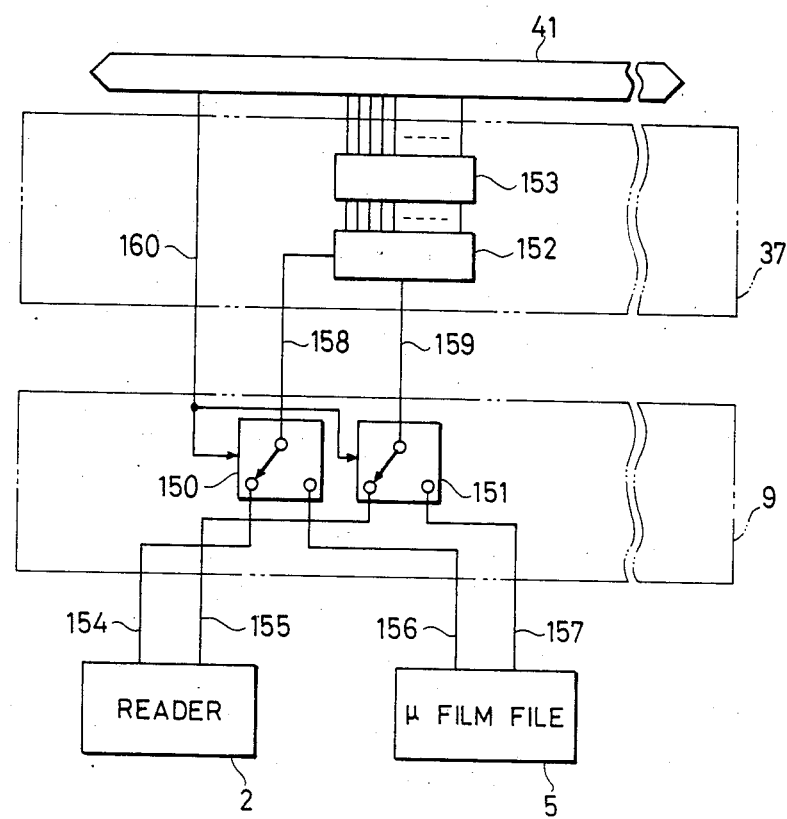
FIG. 14 is a block diagram showing another embodiment of the switching unit.

FIG. 14 shows a partial structure relating to the release of the image signals from the original reader 2 and the microfilm file 5. It is assumed that the original reader 2 has an output transfer rate of 18 MHz while the microfilm file 5 has an output transfer rate of 8 MHz. 154 and 156 and output signal lines for the image signals respectively released from the original reader 2 and the microfilm file 5, and 155 and 157 are pulse signal lines for transmitting clock pulses respectively synchronized with the image signals released to the output signal lines 154, 156.

The switching unit 9 is provided with selector switches 150, 151 which are both controlled by a signal 160 transmitted from the CPU 32 through the I/O interface 37 and the bus 41. The selector switch 150 receives the image signals from the original reader 2 and the microfilm file 5, and the image signals selected by said switch are transmitted to the I/O interface 37 through a signal line 158. On the other hand the selector switch 151 receives the clock pulses from the original reader 2 and the microfilm file 5, and those pulses corresponding to the image output unit selected by the switch 150 are selected and transmitted to the I/O interface 37 through a signal line 159.

The I/O interface 37 is provided with a serial-in-parallel-out register 152 which serially stores every 16 bits of the image signals transmitted from the selector switch 150 through the signal line 158 and releases said signals in parallel manner at the completion of storage of 16 bits, and a latch 153 which latches the output signals of said register 152 and releases thus latched signals at a determined timing to the bus 41. The register 152 also receives the clock pulses selected by the selector switch 151 and transmitted through the signal line 159, in order to achieve shift operation for entering the image signals.

As explained above, the image signals from the original reader 2 and the microfilm file 5, respectively, have transfer rates of 18 MHz and 8 MHz, so that the corresponding clock pulses also have transfer rates of 18 and 8 MHz. Thus, while the selector switch 150 selects the image signals from the original reader 2, the clock pulses of 18 MHz from the original reader 2 are selected by the selector switch 151 and are used as shift pulses of the register 152. On the other hand, while the image signals from the microfilm file 5 are selected by the selector switch 150, the clock pulses of 8 MHz from the microfilm file 5 are selected by the selector switch 151 and are used as the shift pulses of the register 152.

In this manner, the image signals having different transfer rate from the original reader 2 and the microfilm file 5 can be transmitted to the I/O interface 37 through the common signal line 158 and released to the bus 41.

In the foregoing description, an original reader and a microfilm file have been employed, but it is naturally possible to adopt other image signal output devices such as an electronic file or a facsimile device. Also it is possible to transmit the image signals from three or more output devices through a common signal line.

As explained in the foregoing, the present invention allows to connect image output means of different output transfer rates with image processing means through a common signal line instead of employing respective signal lines, thus avoiding complication and the increased cost of the extra wiring.

What we claim is:

1. An image processing system comprising:
plural generating means for generating image signals;

plural forming means for forming an image based on the image signals;

image processing means for processing the image signals generated from said plural generating means and supplying the processed image signals to said plural forming means; and switching means connected with said plural generating means and said plural forming means to selectively supply the image signals generated from one of said plural generating means to another of said plural forming means, said switching means being adapted to supply different image signals from first and second image processing means respectively to mutually different ones of said plural forming means in a parallel manner, respectively.

2. An image processing system according to claim 1, wherein said image processing means designates one or more of said generating means to be operated and one or more of said forming means to be operated, and wherein said switching means is adapted to perform a switching operation according to the designation of said designating means.

3. An image processing system according to claim 1, wherein at least one of said plural plural generating means is a reader means for generating image signals by photoelectrically reading an image.

4. An image processing system according to claim 1, wherein at least one of said plural forming means is a means for recording an image on a recording medium in accordance with the entered image signals.

5. An image processing system according to claim 1, wherein said image processing means processes the image signals entered thereinto in accordance with a processing command.

6. An image processing system according to claim 1, wherein said image processing means includes key means for entering an instruction for image processing, and display means for displaying the image.

7. An image processing system comprising:
plural generating means for generating image signals;
plural forming means for forming an image based on the image signals;

image processing means for processing the image signals generated from said plural generating means and supplying the processed image signals to said plural forming means, said image processing means comprising means for designating one of said plural generating means and one of said plural forming means; and transmission means for selecting the generationg means and the forming means designated by said designating means and causing the transmission of the image signals from said selected generating means to said selected forming means.

8. An image processing system according to claim 7, wherein said transmission means comrprises exchange means connected with said plural generating means and said plural forming means and activates said exchange means according to the designation of said designating means.

9. An image processing system according to claim 7, wherein at least one of said plural generating means is a reader means for generating serial image signals by photoelectrically reading an image.

10. An image processing system according to claim 7, wherein the transmitted image signals from said plural generating means are transmitted to said image processing means through a bus capable of parallel signal transmission.

11. An image processing sytem according to claim 7, wherein the image signals from said image processing means are transmitted to said plural forming means through a bus capable of parallel signal transmission.

12. An image processing system according to claim 7, wherein at least one of said plural forming means is means for recording an image on a recording medium in accordance with the entered image signals.

13. An image processing system according to claim 7, wherein said image processing means includes key means for entering an instruction of image processing, and display means for displaying the image.

14. An image processing system comprising:
first generating means for generating image signals at a first speed;
second generating means for generating image signals at a second speed different from the first speed;
image processing means for receiving image signals transmitted on a bus line and processing the image signals; and
means for supplying the image signals generated from said first and second generating means at mutually different speeds through a common signal line to said bus line.

15. An image processing system according to claim 14, wherein each of said first and second generating means is a reader means to generate image signals by photoelectrically reading an image.

16. An image processing system according to claim 14, further comprising transmission means connected with said first and second generating means for transmitting the image signals generated by said first and second generating means through said common signal line.

17. An image processing system according to claim 14, further comprising means for receiving the image signals transmitted through said common signal line in accordance with the generation speed of the image signals.

18. An image processing system according to claim 14, wherein said image processing means includes key means for entering an instruction for image processing, and display means for displaying the image.

19. An image processing system comprising:
plural generating means for generating image signals;
plural forming means for forming an image based on image signals; and
image processing means for processing the signals generated from said plural generating means and supplying the processed image signals to said plural forming means, said image processing means comprising means for designating one of said plural generating means and one of said plural forming means,
wherein the generating means designated by said designating means generates and supplies image signals to said image processing means, and the forming means designated by said designating means forms an image based on the image signals supplied from said image processing means.

20. An image processing system according to claim 19, wherein at least one of said plural generating means is a reader means to generate image signals by photoelectrically reading an image.

21. An image processing system according to claim 19, wherein at least one of said plural forming means is a means for recording an image on a recording medium in accordance with the entered image signals.

22. An image processing system according to claim 19, wherein said image processing means includes key means for entering an instruction for image processing, and display means for displaying the image.

* * * * *

UNITED STATES PATENT AND TRADEMARK OFFICE
CERTIFICATE OF CORRECTION

PATENT NO. : 4,658,299

DATED : April 14, 1987

INVENTOR(S) : Kanou Tanaka, et al.

It is certified that error appears in the above-identified patent and that said Letters Patent is hereby corrected as shown below:

COLUMN 2

Line 14, "if" should read --is--.
Line 22, "discription." should read --description.--.
Line 60, "generate" should read --generates--.

COLUMN 3

Line 9, "optomagetic" should read --optomagnetic--.
Line 39, "work" should read --word--.

COLUMN 4

Line 57, "image 4" should read --image file 4--.
Line 63, "selectrively" should read --selectively--.

COLUMN 6

Lines 26-27, "Conse-quently the" should read --Consequently, the--.
Line 55, "1-n" should read --1 through n--.

UNITED STATES PATENT AND TRADEMARK OFFICE
CERTIFICATE OF CORRECTION

PATENT NO. : 4,658,299

DATED : April 14, 1987

INVENTOR(S) : Kanou Tanaka, et al.

It is certified that error appears in the above-identified patent and that said Letters Patent is hereby corrected as shown below:

COLUMN 7

Line 19, "fram" should read --frame--.
    Line 26, "date" should read --data--.
    Line 64, "displaying on the CRT" should read
        --displaying on a CRT--.
    Line 67-68, "ac-comodate" should read
        --accommodate--.

COLUMN 8

Line 20, "9, shows" should read --9 shows--.
    Line 42, "low level" should read --low-level--.

COLUMN 9

Line 3, "carryover" should read --carry-over--.
    Line 55, "through keyboard" should read
        --through the keyboard--.

COLUMN 10

Line 46, "low level" should read --low-level--.
    Line 47, "high level" should read --high-level--.
    Line 52, "suppled" should read --supplied--.

UNITED STATES PATENT AND TRADEMARK OFFICE
CERTIFICATE OF CORRECTION

PATENT NO. : 4,658,299
DATED : April 14, 1987
INVENTOR(S) : Kanou Tanaka, et al.

It is certified that error appears in the above-identified patent and that said Letters Patent is hereby corrected as shown below:

COLUMN 12

Line 19, "22" should read --S22--.
    Line 27, "high speed" should read --high-speed--.
    Line 29, "high speed" should read --high-speed--.
    Line 33, "high speed" should read --high-speed--.
    Line 64-65, "high speed" should read --high-speed--.

COLUMN 15

Line 48, "generationg" should read --generating--.
    Line 53, "comprises" should read --comprise--.
    Line 63, delete "transmitted".

Signed and Sealed this

Twenty-fifth Day of August, 1987

*Attest:*

DONALD J. QUIGG

*Attesting Officer*       *Commissioner of Patents and Trademarks*